(12) United States Patent
Chakravarti et al.

(10) Patent No.: US 7,691,950 B2
(45) Date of Patent: *Apr. 6, 2010

(54) POLYESTER POLYCARBONATE COMPOSITIONS, METHODS OF MAKING, AND ARTICLES FORMED THEREFROM

(75) Inventors: Shreyas Chakravarti, Evansville, IN (US); Bernardus Antonius Gerardus Schrauwen, Tilburg (NL); Robert Dirk van de Grampel, Tholen (NL)

(73) Assignee: Sabic Innovative Plastics IP B.V. (NL)

( * ) Notice: Subject to any disclaimer, the term of this patent is extended or adjusted under 35 U.S.C. 154(b) by 201 days.

This patent is subject to a terminal disclaimer.

(21) Appl. No.: 11/741,941

(22) Filed: Apr. 30, 2007

(65) Prior Publication Data

US 2008/0269386 A1    Oct. 30, 2008

(51) Int. Cl.
C08G 63/16    (2006.01)
C08G 64/00    (2006.01)

(52) U.S. Cl. .................. 525/418; 525/439; 525/450

(58) Field of Classification Search .......... 525/439; 524/147
See application file for complete search history.

(56) References Cited

U.S. PATENT DOCUMENTS

| | | | |
|---|---|---|---|
| 4,113,692 A | 9/1978 | Wambach | |
| 4,246,381 A * | 1/1981 | Robeson | 525/444 |
| 4,677,150 A | 6/1987 | Chacko et al. | |
| 5,223,572 A | 6/1993 | Eckel et al. | |
| 5,310,793 A | 5/1994 | Freitag et al. | |
| 5,321,114 A | 6/1994 | Fontana et al. | |
| 6,066,694 A | 5/2000 | Chisholm et al. | |
| 6,143,839 A | 11/2000 | Webb et al. | |
| 6,255,371 B1 | 7/2001 | Schlosser | |
| 6,476,158 B1 | 11/2002 | England et al. | |
| 6,538,065 B1 | 3/2003 | Suriano et al. | |
| 6,552,970 B2 | 4/2003 | Ono et al. | |
| 6,559,270 B1 | 5/2003 | Siclovan et al. | |
| 6,572,956 B1 | 6/2003 | Pickett et al. | |
| 6,583,256 B2 * | 6/2003 | Vollenberg et al. | 528/196 |
| 6,838,518 B2 * | 1/2005 | Seidel et al. | 525/67 |
| 6,949,599 B2 | 9/2005 | Vollenberg et al. | |
| 7,087,682 B2 | 8/2006 | Tadros et al. | |
| 7,109,274 B2 | 9/2006 | Acar et al. | |
| 2002/0132889 A1 | 9/2002 | Penning et al. | |
| 2005/0101757 A1 | 5/2005 | Glasgow et al. | |
| 2005/0158561 A1 | 7/2005 | Wang et al. | |
| 2006/0100394 A1 | 5/2006 | Hale | |

FOREIGN PATENT DOCUMENTS

| | | |
|---|---|---|
| EP | 0155989 | 10/1985 |
| EP | 0272416 A2 | 6/1988 |
| EP | 0355614 | 2/1990 |
| EP | 0465924 A2 | 6/1991 |
| EP | 0687710 A2 | 12/1995 |
| EP | 0933395 A2 | 8/1999 |
| EP | 1624008 A1 | 2/2006 |
| WO | 9304128 | 3/1993 |
| WO | 9963002 | 12/1999 |
| WO | 0026275 A1 | 5/2000 |

OTHER PUBLICATIONS

European Patent Office, International Search Report, Date of Mailing: Jul. 24, 2008, International Application No. PCT/US2008/060204.
European Patent Office, PCT Written Opinion of ISA, Date of Mailing: Jul. 24, 2008, International Application No. PCT/US2008/060204.
ASTM Designation: D 1003-00, "Standard Test Method for Haze and Luminous Transmittance of Transparent Plastics," pp. 1-6, 2000.
UL 94, "Tests for Flammability of Plastic Materials for Parts in Devices and Appliances," pp. 1-34, 2003.
European Patent Office, International Search Report, Date of Mailing: Jun. 25, 2008, International Application No. PCT/US2008/060202.
European Patent Office, International Search Report, Date of Mailing: Jul. 16, 2008, International Application No. PCT/US2008/061227.

* cited by examiner

Primary Examiner—Randy Gulakowski
Assistant Examiner—Kyle Baumstein
(74) Attorney, Agent, or Firm—Cantor Colburn LLP

(57) ABSTRACT

A composition comprises a polyester-polycarbonate polymer comprising isophthalate-terephthalate-resorcinol ester units and carbonate units, a first polyester comprising repeating units derived from cyclohexane dicarboxylic acid or a chemical equivalent thereof, and a $C_{2-8}$ aliphatic diol or a chemical equivalent thereof, and a second polyester comprising units derived from isophthalic and/or terephthalic acid and a chemical equivalent thereof, and a $C_{2-8}$ aliphatic diol or a chemical equivalent thereof. The composition can be extruded into pellets that are clear and colorless. The composition can further be molded into articles having a percent haze value less than or equal to 10 percent, and total luminous transmittance value of greater than or equal to 70 percent, measured in accordance with ASTM D1003-00. Also disclosed is a method for forming the compositions, and articles prepared therefrom.

61 Claims, No Drawings

POLYESTER POLYCARBONATE COMPOSITIONS, METHODS OF MAKING, AND ARTICLES FORMED THEREFROM

BACKGROUND OF THE INVENTION

This disclosure relates to polyester polycarbonate compositions, methods of making, and articles formed therefrom.

Polyesters can be blended with other miscible or immiscible polymers to improve various properties of the polyester. Specifically, polyesters can be blended with polycarbonates to provide improved mechanical properties such as impact strength, and/or can also be added to improve rheological properties such as melt volume rate. However, other properties of the polyester, specifically optical properties, can be adversely affected by forming a blend. Such polyester blends can have a hazy appearance, with diminished light transmittance. Miscible blends, that is, blends that have substantially a single phase, tend to have less haze. It has been difficult, however, to develop blends of polyesters and polycarbonates that have sufficient miscibility to provide good optical properties, while maintaining other advantageous properties of the blends.

There accordingly remains a need in the art for miscible polyester polycarbonate compositions comprising polycarbonate and polyester, in particular polyester polycarbonate compositions having high transparency and low haze. It would be a further advantage if the compositions had other advantageous properties such as weatherability, barrier and chemical resistance.

SUMMARY OF THE INVENTION

The above deficiencies in the art are alleviated by a composition comprising from 15 to 98 weight percent of a polyester-polycarbonate polymer of the formula

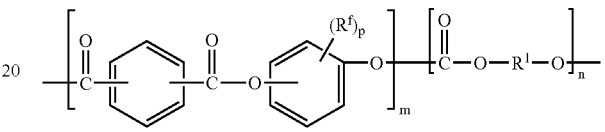

wherein each $R^f$ is independently a halogen atom, a $C_{1-12}$ hydrocarbon group, or a halogen-substituted $C_{1-12}$ hydrocarbon group, p is 0 to 4, and each $R^1$ is independently a $C_{6-30}$ aromatic hydrocarbon group; from 5 to 90 weight percent of a first polyester comprising repeating units of the formula

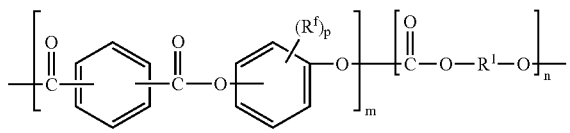

wherein $R^2$ is a $C_{2-8}$ divalent aliphatic group; from 1 to 75 weight percent of a second polyester comprising repeating units of the formula

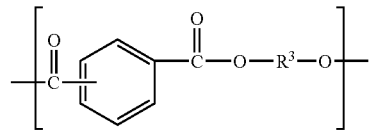

wherein $R^3$ is a $C_{2-8}$ linear divalent aliphatic group; wherein all weight percents are based on the total weight of the composition.

In another embodiment, a composition comprises from 15 to 98 weight percent of a polyester-polycarbonate polymer of the formula

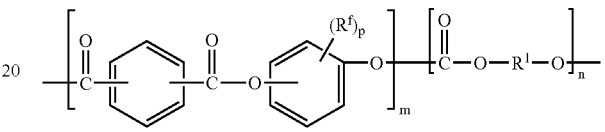

wherein each $R^f$ is independently a halogen atom, a $C_{1-12}$ hydrocarbon group, or a halogen-substituted $C_{1-12}$ hydrocarbon group, p is 0 to 4, each $R^1$ is independently a $C_{6-30}$ aromatic hydrocarbon group, m is 2 to 500, and n is 2 to 500; from 5 to 90 weight percent poly(1,4-cyclohexanedimethylene-1,4-cyclohexanedicarboxylate); from 1 to 75 weight percent of a second polyester consisting essentially of repeating units of the formula

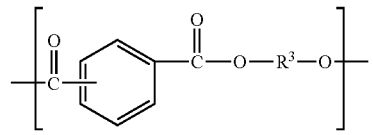

wherein $R^3$ is $C_{2-8}$ divalent aliphatic group selected from ethylene, butylene, cyclohexanedimethylene, or a combination comprising at least one of the foregoing $C_{2-8}$ divalent aliphatic groups; wherein all weight percents are based on the total weight of the composition.

In another embodiment, a composition comprises at least 70 weight percent poly(isophthalate-terephthalate-resorcinol ester)-co-(bisphenol-A carbonate); from 1 to 20 weight percent poly(1,4-cyclohexanedimethylene-1,4-cyclohexanedicarboxylate); and from 1 to 20 weight percent poly(1,4-butylene terephthalate); wherein all weight percents are based on the total weight of the composition; and further wherein an article molded from the composition has a percent haze value of less than or equal to 10 percent, and a total luminous transmittance value of greater than or equal to 70 percent, each measured according to ASTM D1003-00.

In another embodiment, a composition comprises from 45 to 75 weight percent poly(isophthalate-terephthalate-resorcinol ester)-co-(bisphenol-A carbonate); from 10 to 50 weight percent poly(1,4-cyclohexanedimethylene-1,4-cyclohexanedicarboxylate); and from 1 to 20 weight percent poly(ethylene terephthalate)-co-poly(1,4-cyclohexanedimethylene terephthalate), wherein the poly(ethylene terephthalate)-co-poly(1,4-cyclohexanedimethylene terephthalate) comprises from 60 to 80 mole percent ethylene terephthalate units and from 20 to 40 mole percent 1,4-cyclohexanedimethylene terephthalate units; wherein all weight percents are based on the total weight of the composition; and further wherein an article molded from the composition has a percent haze value of less than or equal to 10 percent, and a total luminous transmittance value of greater than or equal to 70 percent, each measured according to ASTM D1003-00.

In another embodiment, a composition comprises from 15 to 65 weight percent poly(isophthalate-terephthalate-resorcinol ester)-co-(bisphenol-A carbonate); from 1 to 55 weight percent poly(1,4-cyclohexanedimethylene-1,4-cyclohexanedicarboxylate); and from 1 to 75 weight percent poly(ethylene terephthalate)-co-poly(1,4-cyclohexanedimethylene terephthalate); wherein the poly(ethylene terephthalate)-co-poly(1,4-cyclohexanedimethylene terephthalate) comprises from 10 to 30 mole percent ethylene terephthalate units and from 70 to 90 mole percent 1,4-cyclohexanedimethylene terephthalate units; wherein all weight percents are based on the total weight of the composition; and further wherein an article molded from the composition has a percent haze value of less than or equal to 10 percent, and a total luminous transmittance value of greater than or equal to 70 percent, each measured according to ASTM D1003-00.

In another embodiment, a composition comprises from 30 to 80 weight percent poly(isophthalate-terephthalate-resorcinol ester)-co-(bisphenol-A carbonate); from 10 to 40 weight percent poly(1,4-cyclohexanedimethylene-1,4-cyclohexanedicarboxylate); and from 10 to 40 weight percent poly(1,4-cyclohexanedimethylene terephthalate); wherein all weight percents are based on the total weight of the composition; and further wherein an article molded from the composition has a percent haze value of less than or equal to 10 percent, and a total luminous transmittance value of greater than or equal to 70 percent, each measured according to ASTM D1003-00.

In another embodiment, a method of forming a composition comprises melt blending the components of the above composition.

In another embodiment, an article comprising the composition is disclosed.

The above described and other features are exemplified by the following detailed description.

DETAILED DESCRIPTION OF THE INVENTION

Surprisingly, it has been found that a composition comprising, in specific ratios, a blend of a polyester-polycarbonate polymer having isophthalate terephthalate resorcinol (ITR) ester units and carbonate units, a first polyester comprising units derived from cyclohexane dicarboxylic acid or a chemical equivalent thereof, and a $C_{2-8}$ aliphatic diol or a chemical equivalent thereof, and a second polyester comprising units derived from isophthalic acid, terephthalic acid, or a chemical equivalent thereof, and a $C_{2-8}$ aliphatic diol, or a chemical equivalent thereof, has a low haze value and a high total luminous transmittance value. The blend of these polymers can be extruded to provide transparent pellets when the amount of the polyester-polycarbonate polymer is from 5 to 85 weight percent (wt %), the amount of the poly($C_4$-alkylene terephthalate) ester is from 1 to 70 wt %, and the amount of the polyester is from 1 to 85 wt %.

The singular forms "a," "an," and "the" include plural referents unless the context clearly dictates otherwise. The terms "first," "second," and the like herein do not denote any order, quantity, or importance, but rather are used to distinguish one element from another. The term "combination thereof" means that one or more of the listed components is present, optionally together with one or more like components not listed. Unless defined otherwise, technical and scientific terms used herein have the same meaning as is commonly understood by one of skill. Compounds are described using standard nomenclature.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All ASTM tests and data are from the 2003 edition of the Annual Book of ASTM Standards unless otherwise indicated.

The composition comprises a polyester-polycarbonate polymer, also known as a polyester carbonate, copolyester-polycarbonate, and copolyestercarbonate. The polyester-polycarbonate polymer comprises ITR ester units and carbonate units of the formula (1)

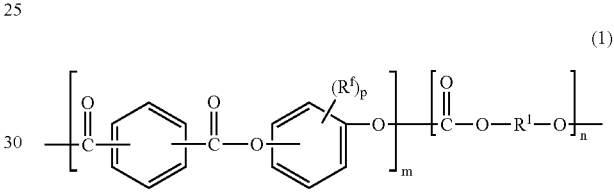

wherein each $R^f$ is independently a halogen atom, a $C_{1-12}$ hydrocarbon group, or a halogen-substituted $C_{1-12}$ hydrocarbon group, p is 0 to 4, each $R^1$ is independently a $C_{6-30}$ hydrocarbon group wherein at least 60% of the $R^1$ groups are aromatic, and m and n are each independently greater than one. In an embodiment, m is 2 to 500, and n is 2 to 500.

In a specific embodiment, $R^f$ in formula (1) is a $C_{1-3}$ alkyl group or a halogen-substituted $C_{1-3}$ alkyl group, and p is 0 to 2. In another embodiment, p is zero.

The ITR ester units can be derived from the reaction of a mixture of terephthalic acid and isophthalic acid or a chemical equivalent thereof with a compound such as resorcinol, 5-methyl resorcinol, 5-ethyl resorcinol, 5-propyl resorcinol, 5-butyl resorcinol, 5-t-butyl resorcinol, 2,4,5-trifluoro resorcinol, 2,4,6-trifluoro resorcinol, 4,5,6-trifluoro resorcinol, 2,4,5-tribromo resorcinol, 2,4,6-tribromo resorcinol, 4,5,6-tribromo resorcinol, or a combination comprising at least one of the foregoing compounds.

In another specific embodiment, $R^1$ in formula (1) is derived from a dihydroxy compound of formula (2)

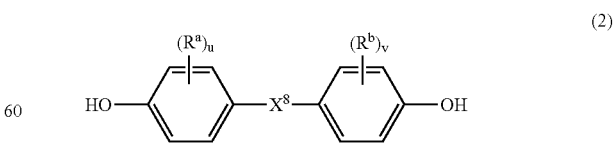

wherein each $R^a$ and $R^b$ is independently a halogen atom or a $C_{1-12}$ alkyl, and u and v are each independently integers of 0 to 4. Also in formula (2), $X^a$ represents a bridging group connecting the two hydroxy-substituted aromatic groups, wherein the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic group. The $C_{1-18}$ organic bridging group can be cyclic (including fused rings) or acyclic, aromatic (including fused rings) or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group.

In one embodiment, $R^a$ and $R^b$ are each independently a halogen or a $C_{1-3}$ alkyl group, and u and v are each independently 0 to 1. In this or other embodiments, $X^a$ is a $C_{1-18}$ alkylene group, a $C_{3-18}$ cycloalkylene group, a fused $C_{6-18}$ cycloalkylene group, a group of the formula —B$^1$—W—B$^2$— wherein B$^1$ and B$^2$ are the same or different $C_{1-6}$ alkylene group and W is a $C_{3-12}$ cycloalkylidene group or a $C_{6-16}$ arylene group, a $C_{3-18}$ cycloalkylidene, a $C_{1-25}$ alkylidene of formula —C(R$^c$)(R$^d$)— wherein R$^c$ and R$^d$ are each independently hydrogen, $C_{1-12}$ allyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=R$^e$)— wherein R$^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. The foregoing $X^a$ groups can be unsubstituted or substituted with one or more halogens, $C_{1-12}$ alkyl groups, $C_{6-18}$ aromatic groups, and/or heteroatom containing groups, such as ester, amide, and the like.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3,5-trimethylcyclohexylidenebisphenol, 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds, 1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, $R^1$ is derived from bisphenol A.

In one embodiment, the ratio of ITR ester units (m) to the carbonate units (n) in the polyester-polycarbonate is 5:95 to 25:75.

In a specific embodiment of the polyester-polycarbonate polymer of formula (1), $R^f$ is a $C_{1-3}$ alkyl group or a halogen-substituted $C_{1-3}$ alkyl group, p is 0 to 2, $R^a$ and $R^b$ are each independently a halogen or a $C_{1-3}$ alkyl group, u and v are each independently 0 to 1, and $X^a$ is a $C_{1-25}$ alkylidene of formula —C(R$^c$)(R$^d$)— wherein R$^c$ and R$^d$ are each independently hydrogen, $C_{1-12}$ alkyl, or $C_{7-12}$ arylalkyl. In another embodiment, p is zero, u and v are each zero, and $X^a$ is a $C_{1-13}$ alkylidene of formula —C(R$^c$)(R$^d$)— wherein R$^c$ and R$^d$ are each independently hydrogen or $C_{1-6}$ alkyl, specifically methyl.

Chain stoppers (also referred to as capping agents), which limit molecular weight growth rate during manufacture of the polymer can be used. Suitable chain stoppers include monophenolic compounds such as phenol, p-cumyl-phenol, p-tertiary-butyl phenol, and hydroxy diphenyl, monoethers of hydroquinones such as p-methoxyphenol, allyl-substituted phenols including those with branched chain alkyl substituents having 8 to 9 carbon atoms, mono-phenolic UV absorber such as 4-substituted-2-hydroxybenzophenone, aryl salicylate, monoesters of diphenols such as resorcinol monobenzoate, 2-(2-hydroxyaryl)-benzotriazole, 2-(2-hydroxyaryl)-1,3,5-triazines, and the like; monocarboxylic acid chlorides such as benzoyl chloride, $C_{1-22}$ alkyl-substituted benzoyl chlorides (e.g., 4-methylbenzoyl chloride), halogen-substituted benzoyl chlorides (e.g., bromobenzoyl chloride), cinnamoyl chloride, 4-nadimidobenzoyl chloride, trimellitic anhydride chloride, and chlorides of aliphatic monocarboxylic acids with up to 22 carbon atoms; and monochloroformates such as phenyl chloroformate, $C_{1-22}$ alkyl-substituted phenyl chloroformate, p-cumyl phenyl chloroformate, toluene chloroformate, and the like. Specific monophenolic chain stoppers include phenol, p-cumylphenol, and resorcinol monobenzoate.

The polyester-polycarbonate polymers can have a weight-averaged molecular weight (Mw) of 1,500 to 100,000 atomic mass units, specifically 1,700 to 50,000 atomic mass units, and more specifically 2,000 to 40,000 atomic mass units. Molecular weight determinations are performed using gel permeation chromatography (GPC), using a crosslinked styrene-divinylbenzene column and calibrated to polystyrene references. Samples are prepared at a concentration of about 1 mg/ml, and are eluted at a flow rate of about 1.0 ml/min.

The poly(isophthalate-terephthalate-resorcinol ester)s can be obtained by interfacial polymerization or melt-process condensation, by solution phase condensation, or by transesterification polymerization. It is possible to use a branched poly(isophthalate-terephthalate-resorcinol ester)s in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the poly(isophthalate-terephthalate-resorcinol ester)s, depending on the ultimate end use of the composition.

The poly(isophthalate-terephthalate-resorcinol ester)s can then be reacted with a carbonate precursor in the presence of a suitable dihydroxy compound such as an aromatic diol of formula (2). Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. It is also desirable to include a chain stopper in addition to the dihydroxy compound.

In a specific embodiment, a poly(isophthalate-terephthalate-resorcinol ester) is prepared by solution phase condensation, i.e., is prepared by contacting a mixture of isophthalic acid and terephthalic acid with resorcinol in a suitable solvent. To the resulting mixture is then added BPA, phenol (chain stopper), and phosgene (carbonyl chloride, a carbonate precursor). Poly(isophthalate-terephthalate-resorcinol ester)-co-(bisphenol-A carbonate) is thus produced.

The first polyester can be advantageously selected to have repeating units according to the formula (3)

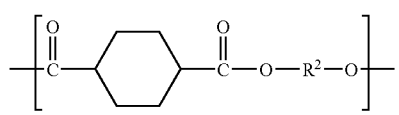
(3)

wherein $R^2$ is a $C_{2-8}$ divalent aliphatic group. Useful polyesters according to formula (3) include poly(ethylene 1,4-cyclohexanedicarboxylate), poly(propylene 1,4-cyclohexanedicarboxylate), poly(butylene 1,4-cyclohexanedicarboxylate), poly(1,4-cyclohexanedimethylene 1,4-cyclohexanedicarboxylate) (PCCD), and the like. In an advantageous embodiment, the first polyester is PCCD.

The second polyester can be advantageously selected to have repeating units according to the formula (4)

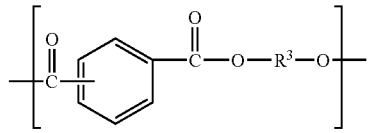
(4)

wherein $R^3$ is a $C_{2-8}$ linear divalent aliphatic group. Advantageous second polyesters according to formula (4) can be selected from poly(cyclohexyldimethylene terephthalate) (PCT), poly(1,4-butylene terephthalate) (PBT), poly(ethylene terephthalate)-co-(1,4-cyclohexyldimethylene terephthalate), abbreviated as PETG where the polymer comprises greater than 50 mol % of ethylene terephthalate ester units, and abbreviated as PCTG where the polymer comprises greater than 50 mol % of 1,4-cyclohexyldimethylene terephthalate ester units. In one embodiment, the poly(ethylene terephthalate)-co-(1,4-cyclohexyldimethylene terephthalate) comprises 10 to 90 mole percent ethylene terephthalate units and 10 to 90 mole percent 1,4-cyclohexyldimethylene terephthalate units. Additionally, up to 30 mole percent of isophthalate units can be present along with terephthalate units in both PCTG and PETG. In one embodiment, the second polyester is PCT. In another embodiment, the second polyester is PBT. In another embodiment, the second polyester is PETG. In yet another embodiment, the second polyester is PCTG.

The polyesters can be obtained by interfacial polymerization or melt-process condensation, by solution phase condensation, or by transesterification polymerization wherein, for example, a dialkyl ester such as dimethyl terephthalate can be transesterified with 1,4-butane diol using acid catalysis, to generate poly(1,4-butylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition. The polyesters described herein are generally completely miscible with the polyester-polycarbonate polymers when blended.

The polyester-polycarbonate polymer is present in the composition in an amount of 15 to 98 weight percent. In one embodiment, the polyester-polycarbonate polymer is present in the composition in an amount of at least 70 weight percent. In another embodiment, the polyester-polycarbonate polymer is present in the composition in an amount of 45 to 75 weight percent. In another embodiment, the polyester-polycarbonate polymer is present in the composition in an amount of 15 to 65 weight percent. In yet another embodiment, the polyester-polycarbonate polymer is present in the composition in an amount of 30 to 80 weight percent.

The first polyester is present in the composition in an amount of 5 to 90 weight percent. In one embodiment, the first polyester is present in the composition in an amount of 1 to 20 weight percent. In another embodiment, the first polyester is present in the composition in an amount of 10 to 50 weight percent. In another embodiment, the first polyester is present in the composition in an amount of 1 to 55 weight percent. In yet another embodiment, the first polyester is present in the composition in an amount of 10 to 40 weight percent The second polyester is present in the composition in an amount of 1 to 75 weight percent. In one embodiment, the second polyester is present in the composition in an amount of 1 to 20 weight percent. In another embodiment, the polyester is present in the composition in an amount of 1 to 75 weight percent. In yet another embodiment, the polyester is present in the composition in an amount of 10 to 40 weight percent. All weight percents discussed above are based on the total weight of the composition.

In addition to the polyester-polycarbonate polymer, the first polyester, and the second polyester, the composition can include various other additives ordinarily incorporated with compositions of this type, such as an antioxidant, a heat stabilizer, a light stabilizer, an ultraviolet light absorber, a plasticizer, a mold release agent, a lubricant, an antistatic agent, a pigment, a dye, a quencher, a flame retardant, or a gamma stabilizer. Mixtures of the foregoing additives can be used. Such additives can be mixed at a suitable time during the mixing of the components for forming the composition.

The composition can comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Blue 15:4, Pigment Blue 28, Pigment Green 7, Pigment Yellow 147 and Pigment Yellow 150, or combinations comprising at least one of the foregoing pigments. Pigments can be used in amounts of 0.01 to 10 percent by weight, based on the total weight of the composition.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes can be used in amounts of 0.01 to 10 percent by weight, based on the total weight of the composition, where the use of the dyes does not significantly adversely affect the desired properties of the composition.

The composition can further comprise an antioxidant. Suitable antioxidant additives include, for example, organophosphites such as tris(nonyl phenyl)phosphite, tris(2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 percent by weight, based on the total weight of the composition.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 percent by weight, based on the total weight of the composition.

Suitable quenchers include zinc phosphate, mono zinc phosphate, phosphorous acid or phosphoric acid (diluted in water), sodium acid pyrophosphate and other phosphorous based compounds. Quenchers are not restricted to just phosphorus-based compounds, they can also include silicon-based compounds (such as tetrapropyl orthosilicate or tetrakis-(2-methoxyethoxy)silane). Sometimes they could also include compounds such as sodium lauryl sulphate, boric acid, citric acid, oxalic acid, and cyclic iminoether containing compounds. Quenchers can be used in an amount that is at least 0.0001 based on the total weight of the polyester-polycarbonate polymer, the poly($C_4$-alkylene terephthalate) ester, and the polyester. In one suitable embodiment, the amount of the quencher can range from 0.0001 to 0.2 percent by weight, based on the total weight of the polyester-polycarbonate polymer, the poly($C_4$-allylene terephthalate) ester, and the polyester.

The composition can further comprise another polymer such as a polycarbonate, poly(ethylene terephthalate), a polyetherimide, or a combination thereof. In one embodiment, the composition comprises less than 5 wt % of a polycarbonate, polyethylene terephthalate, or a combination thereof. In another embodiment, the composition comprises less than 20 wt % of a polyetherimide.

In one embodiment, a composition contains a flame retarding component. The flame-retarding component can be added the composition to suppress, reduce, delay, or modify the propagation of a flame through a composition or an article based on the composition. The flame-retarding component can be halogenated hydrocarbons (chlorine- and bromine-containing compounds and reactive flame retardants), inorganic flame retardants (boron compounds, antimony oxides, aluminum hydroxide, molybdenum compounds, zinc and magnesium oxides), phosphorous containing compounds (organic phosphates, phospinates, phosphites, phosphonates, phosphene, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octamolybdate (AOM), zirconium compounds, titanium compounds, zinc compounds such as zinc stannate, zinc hydroxy-stannate, as well as others.

The flame retarding component can include halogen-containing compounds. Examples of suitable halogenated organic flame retardants can include brominated flame retardants, chlorinated flame retardants. Examples of such flame retardants include tetrabromobisphenol A, octabromobiphenyl ether, decabromodiphenyl ether, bis(tribromophenoxy)ethane, tetrabromobiphenyl ether, hexabromocyclododecane, tribromophenol, bis(tribromophenoxy)ethane tetrabromobisphenol A polycarbonate oligomers, tetrabromobisphenol A epoxy oligomers. Typically halogenated aromatic flame-retardants include tetrabromobisphenol A polycarbonate oligomer, polybromphenyl ether, brominated polystyrene, brominated BPA polyepoxide, brominated imides, brominated polycarbonate, poly (haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis (hexachlorocyclopentadieno)cyclo-octane as well other such functionally equivalent materials.

The flame retarding component can include phosphorus-containing compounds. Examples of suitable phosphorous flame retardants include red phosphorus, ammonium polyphosphate. Organophoshorus flame retardants can include halogenated phosphates, non-halogenated compounds. Examples of such materials include tris(1-chloro-2-propyl)phosphate, tris(2-chloroethyl)phosphate, tris(2,3-dibromopropyl)phosphate, phosphate esters, trialkyl phosphates, triaryl phosphates, aryl-alkyl phosphates, and combinations thereof. Other flame retardants can include polyols, phosphonium derivatives, phosphonates, phosphanes, phosphines.

Specific structures of phosphorous-containing compounds include phosphates of the formula

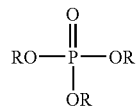

where R is a $C_{1-18}$ alkyl, cycloalkyl, aryl, or aralkyl, e.g., cyclohexyl, isopropyl, isobutyl, and the like; phosphonates of the formula

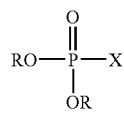

where X is H, and R can be a $C_{1-18}$ alkyl, cycloalkyl, aryl, or, aralkyl, e.g., cyclohexyl, isopropyl, isobutyl, and the like; phosphinates of the formula

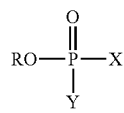

where X and Y is each H, and R is a $C_{1-18}$ alkyl, cycloalkyl, aryl, or, aralkyl, e.g., cyclohexyl, isopropyl, isobutyl, and the like, or an amino functionalized group; phosphine oxides of the formula

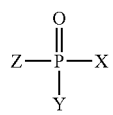

where X, Y, Z=H and R is a $C_{1-18}$ allyl, cycloalkyl, aryl, or, aralkyl, e.g., cyclohexyl, isopropyl, isobutyl, and the like; phosphines of the formula.

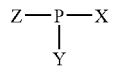

where X, Y, Z is H, a $C_{1-18}$ alkyl, aryl, aralkyl, and the like; or phosphites of the formula.

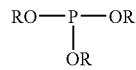

where each R is independent a $C_{1-18}$ alkyl, cycloalkyl, aryl, or aralkyl, e.g., cyclohexyl, isopropyl, isobutyl, and the like, and H.

As such, suitable flame-retarding additives that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently a $C_{1-18}$ alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

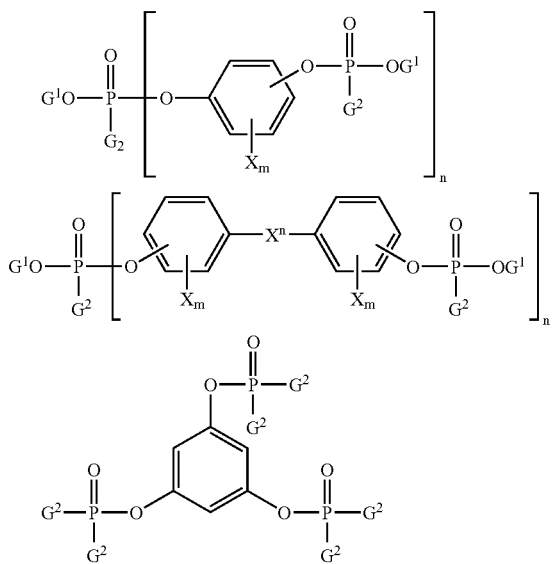

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl)phosphate of bisphenol-A, respectively, their oligomeric and polymeric counterparts, and the like.

Exemplary suitable flame retarding compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of about 1 to about 20 parts by weight, based on 100 parts by weight of the total composition.

In one embodiment, the flame-retarding polyester composition includes a flame retarding quantity of one or a mixture of nitrogen-containing flame retardants such as triazines, guanidines, cyanurates, and isocyanurates. Suitable triazines have the formula

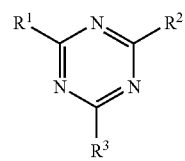

wherein $R^1$, $R^2$, and $R^3$ are independently $C_{1-12}$ allyl, $C_{1-12}$ alkoxyl, $C_{6-12}$ aryl, amino, $C_{1-12}$ alkyl-substituted amino, or hydrogen. Highly suitable triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame-retardants are used in combination with one or more phosphorous-based compounds. The phosphinates and diphosphinates include those set forth in U.S. Pat. No. 6,255,371 to Schosser et al. Specific phosphinates mentioned include aluminum diethylphosphinate (DEPAL), and zinc diethylphosphinate (DEPZN). The phosphinates have the formula

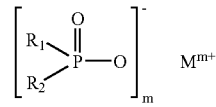

and/or the formula,

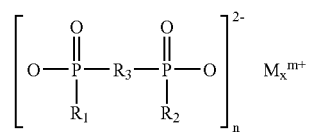

and or polymers comprising such formulas where $R_1$ and $R_2$ are identical or different and are H, $C_{1-6}$ alkyl, linear or branched, and/or aryl; $R_3$ is $C_{1-10}$ alkylene, linear or branched, $C_{6-10}$ arylene, alkylarylene or arylalkylene; M is any metal, but suitable are magnesium, calcium, aluminum or zinc, m is 1, 2 or 3; n is 1, 2 or 3; x is 1 or 2.

In one embodiment, $R_1$ and $R_2$ can be H, in addition to the substituents referred to set forth. This results in a hypophosphite, a subset of phosphinate, such as Calcium hypophosphite, aluminum hypophosphite, and the like.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially suitable is antimony trioxide ($Sb_2O_3$). Synergists, such as antimony oxides, are typically used at about 0.5 to 15 by weight based on the weight percent of resin in the final composition.

Also, the final composition may contain poly(tetrafluoroethylene) (PTFE) type resins or copolymers used to reduce dripping in flame-retarding thermoplastics.

Flame-retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %. In one embodiment, the amount of the flame retarding component ranges from 5 wt. % to 30 wt. %. In another embodiment, the amount of the flame retarding component ranges from 10 to 20 wt. %.

Light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 1 percent by weight, based on the total weight of the composition.

Suitable ultraviolet light absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing ultraviolet light absorbers. Ultraviolet light absorbers can be used in amounts of 0.0001 to 1 percent by weight, based on the total weight of the composition.

Plasticizers, lubricants, and/or mold release agents additives can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 percent by weight, specifically 0.01 to 0.75 percent by weight, more specifically 0.1 to 0.5 percent by weight, based on the total weight of the composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, allyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat® 6321 (Sanyo) or Pebax® MH1657 (Atofina), Irgastat® P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. Antistatic agents can be used in amounts of 0.0001 to 5 percent by weight, based on the total weight of the composition.

In an embodiment, the foregoing additives are present in a total amount of less than or equal to 5 wt %, based on the total weight of the composition.

The composition can be manufactured by methods generally available in the art, for example, in one embodiment, powdered polyester-polycarbonate polymer, first polyester, second polyester, and other optional components including stabilizer packages (e.g., antioxidants, gamma stabilizers, heat stabilizers, ultraviolet light stabilizers, and the like) and/or other additives are first blended, for example, in a HENSCHEL-Mixer® high speed mixer. Other low shear processes including but not limited to hand mixing can also accomplish this blending. The blend is then fed into the throat of an extruder via a hopper. Alternatively, one or more of the components can be incorporated into the composition by feeding directly into the extruder at the throat and/or downstream through a sidestuffer. Where desired, the polyester-polycarbonate polymer, first polyester, second polyester, and any desired polymer and/or additives can also be compounded into a masterbatch and combined with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In a specific embodiment, a method of preparing the composition comprises melt blending a polyester-polycarbonate polymer, a first polyester, and a second polyester. The melt blending can be done by extrusion.

In another specific embodiment, the composition is extruded using a 28 mm twin-screw extruder with a vacuum vented mixing screw. The extruder is typically operated at a temperature of 200 to 300° C., specifically 220 to 285° C., more specifically 240 to 270° C., wherein the die temperature can be different. The extruded composition is quenched in water and pelletized.

The extruded pellets formed from the composition have excellent optical properties. Thus in one embodiment, the extruded pellets comprising the composition are clear. In another embodiment, the extruded pellets comprising the composition are colorless. In yet another embodiment, the extruded pellets comprising the composition are clear and colorless.

As such, one embodiment is a composition comprising from 15 to 98 weight percent of a polyester-polycarbonate polymer of the formula (1) wherein each $R^f$ is independently a halogen atom, a $C_{1-12}$ hydrocarbon group, or a halogen-substituted $C_{1-12}$ hydrocarbon group, p is 0 to 4, and each $R^1$ is independently a $C_{6-30}$ aromatic hydrocarbon group; from 5 to 90 weight percent of a first polyester comprising repeating units of the formula (11) wherein $R^2$ is a $C_{2-8}$ divalent aliphatic group; from 1 to 75 weight percent of a second polyester comprising repeating units of the formula (12) wherein $R^3$ is a $C_{2-8}$ linear divalent aliphatic group; wherein all weight percents are based on the total weight of the composition; and further wherein an extruded pellet comprising the composition is clear.

Another embodiment is a composition comprising from 15 to 98 weight percent of a polyester-polycarbonate polymer of the formula (1) wherein each $R^f$ is independently a halogen atom, a $C_{1-12}$ hydrocarbon group, or a halogen-substituted $C_{1-12}$ hydrocarbon group, p is 0 to 4, and each $R^1$ is independently a $C_{6-30}$ aromatic hydrocarbon group; from 5 to 90 weight percent of a first polyester comprising repeating units of the formula (11) wherein $R^2$ is a $C_{2-8}$ divalent aliphatic group; from 1 to 75 weight percent of a second polyester comprising repeating units of the formula (12) wherein $R^3$ is a $C_{2-8}$ linear divalent aliphatic group; wherein all weight percents are based on the total weight of the composition; and further wherein an extruded pellet comprising the composition is clear and colorless.

Articles can then be shaped, extruded, or molded from the composition. In particular, various known molding methods can be used, for example, injection molding, gas assist injection molding, vacuum molding, compression molding, rotary molding, and the like. Injection molding can be advantageous. Examples of articles comprising the composition include lens covers, sheets, protective sheets, films, fibers, dishware, medical applications, automotive, garden equipment, sports and leisure articles, and the like.

Articles molded from the composition exhibit advantageous optical properties. Percent haze and total luminous transmittance, determined in accordance with ASTM D1003-00, are used to describe the optical properties of the articles molded from the composition. An article molded from the composition has a percent haze value of less than or equal to 10 percent. Another article molded from the composition has a total luminous transmittance value of greater than or equal to 70 percent. Another article molded from the composition has a percent haze value of less than or equal to 10 percent and a total luminous transmittance value of greater than or equal to 70 percent.

The compositions are further illustrated by the following non-limiting examples.

EXAMPLES

The compositions were compounded on a Werner and Pfleider 28 millimeter twin screw extruder with a vacuum vented mixing screw, barrel and die head temperatures between 240° C. and 265° C., and 150 to 300 rpm screw speed. The extruder has eight (8) independent feeders and could be operated at a maximum rate of 30 kilograms per hour. The extrudate was cooled through a water bath prior to pelletizing. Test parts were injection molded on a van Dorn molding machine with a temperature of 240° C. to 265° C. The pellets were dried for 3 to 4 hours at 60° C.-120° C. in a forced air circulating oven prior to injection molding.

Polymer molecular weights were determined by gel permeation chromatography (GPC) using a crosslinked styrene-divinylbenzene gel column, a sample concentration of 1 milligram per milliliter, and was calibrated using polycarbonate standards. Percent haze (Haze), total luminous transmittance (% T), and yellowing index (YI) were measured on 2.5 millimeter plaques according to ASTM D1003-00 using a Haze-Guard Dual, obtained from BYK-Gardner.

Compositions for the examples and comparative examples were prepared using the components shown in Table 1.

TABLE 1

| Component | Description | Source |
|---|---|---|
| 20:80 ITR-PC | Poly(20 mol % isophthalate-terephthalate-resorcinol)-co-(80 mol % bisphenol-A carbonate) copolymer (Mw = 60,000 g/mol, PS standards) | GE Plastics |
| PBT | Poly(butylene terephthalate) (Mw = 105,000 g/mol, PS standard) | GE Plastics |
| PCCD | Poly(cyclohexanedimethylene cyclohexanedicarboxylate) | Eastman Chemical |
| PETG | Poly(70 mol % ethylene terephthalate)-co-(30 mol % 1,4-cyclohexanedimethylene terephthalate) (MW = 70,000 g/mol, PS standards) | Eastman Chemical |
| PCTG | Poly(20 mol % ethylene terephthalate)-co-(80 mol % 1,4-cyclohexanedimethylene terephthalate) (Mw = 70,000 g/mol, PS standards) | Eastman Chemical |
| PCT | Poly(1,4-cyclohexanedimethylene terephthalate) (Mw = 70,000 g/mol, PS standards) | Eastman Chemical |

Each of the ITR-PC polymers used herein was prepared according to the following general procedure. A 30 liter round bottom reactor equipped with a mechanical stirrer, pH electrode, condenser, and two addition tubes connected to metering pumps was charged with resorcinol (12.5 to 25 mole percent (mol %) excess relative to the total moles of diacid chloride), water (to provide 34 to 35 wt % salts following preparation of the hydroxy-terminated polyester), methylene chloride (6 liters), and triethylamine (2 mol %). The mixture was stirred with a 6-inch impeller at 300 to 350 rpm. One addition tube was connected to a solution consisting of a 50:50 mixture of isophthaloyl and terephthaloyl chloride and enough methylene chloride to make an approximately 35 wt % diacid chloride solution. The other addition tube was connected to a 50 wt % aqueous sodium hydroxide solution. Over the course of 10 minutes, the diacid chloride solution containing 3.42 moles isophthaloyl dichloride and 3.42 moles terephthaloyl dichloride, and 85 to 95 mol % of the NaOH solution (based on diacid chloride) were added at constant molar flow rates to the reactor. Upon completion of the acid chloride addition, a further amount of NaOH solution was added to the reactor over 3 minutes in order to adjust the pH to approximately 8.25, and the mixture was allowed to stir for roughly 10 minutes. After formation of the resulting hydroxy-terminated polyesters was complete, phenol (3.4 mol % based on total bisphenol-A), bisphenol-A (BPA), water, and methylene chloride were added to the mixture. The amount of BPA added was based upon the formula:

Moles BPA added=6.84 moles diacid chloride×((mol % PC)/(mol % ITR))

Wherein, for example, a polymer with a desired composition of 20 mol % carbonate units and 80 mol % ester units (i.e., 80:20 ITR-PC), uses an amount of BPA=6.84×20/80=1.71 moles BPA.

Prior to phosgenation, sufficient additional water was added to dissolve all of the sodium chloride present in the reaction mixture at the end of formation of the hydroxy-terminated polyester intermediate. Additional methylene chloride was introduced to provide a concentration of solids in the organic phase at the end of phosgenation of 11 to 17 wt %.

The mixture comprising the hydroxy-terminated polyester, free phenol, free excess resorcinol, BPA, methylene chloride, sodium chloride, and triethylamine (TEA) was then phosgenated in the same reactor used to prepare the hydroxy-terminated polyester intermediate. 1.4 equivalents (based on the total moles of free BPA) of phosgene and 50 wt % sodium hydroxide solution (50 wt % NaOH) were then introduced at a constant rate over a period of 55 minutes while maintaining a pH of 8.5 until 60 mol % of the stoichiometric amount of phosgene had been added (60 mol % BPA conversion). The pH was adjusted to 9.5 and the remaining phosgene was added. Upon completion of phosgene addition, the reaction mixture was stirred for several minutes. The methylene chloride solution containing the product polyester-polycarbonate was separated from the brine layer and washed twice with 1 N HCl, and four times with deionized water. The volumes of the aqueous washes were roughly equal to the volume of the product polymer solution. The product was isolated by injection of steam into a well-agitated mixture of hot water and the methylene chloride solution of the product polyester-polycarbonate. The product was isolated as a white powder, was filtered and dried for 24 hours at 80° C. to 100° C. The product polyester-polycarbonate was characterized by GPC (Mw, polystyrene molecular weight standards). The analytical results were consistent with the formation of block polyester-polycarbonates. NMR indicated that the product polyester-polycarbonate was fully end capped as shown by the absence of free terminal hydroxy groups and acid end-groups.

Examples 1-53, represented as En wherein n corresponds to the number of the experiment, and comparative examples 1-19, represented as Cn wherein n corresponds to the number of the experiment, were prepared by melt blending 20:80 ITR-PC with PCCD and PBT, PETG, PCTG, or PCT according to the method described above. The weight ratios used in the examples and comparative examples are as described in Tables 2-5. All component amounts are in weight percent, based on the total weight of the composition. The appearance column refers to the appearance of pellets extruded from each composition before molding. The appearance is reported as clear, hazy, or opaque. Clear refers to compositions that are clear and colorless, or clear and colored, and that allow clear images to pass through them undistorted. Hazy refers to compositions that allow light to pass through them, however images are blurred and/or distorted, or only partial images pass through them. Opaque compositions block all light from passing through them. Percent haze and total luminous transmittance are reported for molded articles of the compositions as described above.

TABLE 2

| | PCCD | PBT | 20:80 ITR-PC | Post Extrusion appearance | % T | Haze |
|---|---|---|---|---|---|---|
| C1 | 50 | 50 | — | Opaque | — | — |
| E1 | 40 | 40 | 20 | Opaque | — | — |
| E2 | 30 | 20 | 50 | Hazy | — | — |
| E3 | 10 | 20 | 70 | Clear | 70.8 | 11.5 |
| E4 | 10 | 30 | 60 | Clear | 63.2 | 16.6 |
| E5 | 20 | 10 | 70 | Clear | 71.9 | 11.7 |
| E6 | 20 | 20 | 60 | Hazy | 46.4 | 42.5 |
| E7 | 12.5 | 12.5 | 75 | Clear | 66.7 | 13.5 |
| E8 | 10 | 10 | 80 | Clear | 86.6 | 3.0 |

TABLE 3

| | PCCD | PCTG | 20:80 ITR-PC | Post Extrusion appearance | % T | Haze |
|---|---|---|---|---|---|---|
| C2 | 50 | 50 | — | Opaque | 9.0 | 99.3 |
| C3 | 85 | 15 | — | Opaque | 36.6 | 99.1 |
| C4 | 15 | 85 | — | Opaque | 30.5 | 98.9 |
| C5 | 10 | 80 | 10 | Hazy | 62.0 | 71.5 |
| C6 | 45 | 45 | 10 | Hazy | 12.3 | 99.3 |
| C7 | 80 | 10 | 10 | Hazy | 46.7 | 94.9 |
| E9 | 40 | 40 | 20 | Hazy | 17.1 | 98.1 |
| E10 | 70 | 10 | 20 | Hazy | 52.3 | 87.7 |
| E11 | 10 | 70 | 20 | Clear | 77.9 | 9.0 |
| E12 | 35 | 35 | 30 | Hazy | 25.9 | 77.2 |
| E13 | 60 | 10 | 30 | Clear | 64.1 | 39.3 |
| E14 | 10 | 60 | 30 | Clear | 84.9 | 1.5 |
| E15 | 30 | 30 | 40 | Clear | 53.5 | 22.9 |
| E16 | 10 | 50 | 40 | Clear | 86.2 | 1.8 |
| E17 | 50 | 10 | 40 | Clear | 81.8 | 5.7 |
| E18 | 20 | 40 | 40 | Clear | 77.6 | 3.1 |
| E19 | 40 | 20 | 40 | Clear | 87.7 | 1.1 |
| E20 | 25 | 25 | 50 | Clear | 87.3 | 1.2 |
| E21 | 15 | 35 | 50 | Clear | 87.3 | 1.1 |
| E22 | 35 | 15 | 50 | Clear | 87.9 | 1.4 |
| E23 | 45 | 5 | 50 | Clear | 88.7 | 1.5 |

TABLE 3-continued

| | PCCD | PCTG | 20:80 ITR-PC | Post Extrusion appearance | % T | Haze |
|---|---|---|---|---|---|---|
| E24 | 5.15 | 44.85 | 50 | Clear | 87.0 | 1.2 |
| E25 | 20 | 20 | 60 | Clear | 87.3 | 1.5 |
| E26 | 15 | 15 | 70 | Clear | 87.2 | 1.6 |

TABLE 4

| | PCCD | PCT | 20:80 ITR-PC | Post Extrusion appearance | % T | Haze |
|---|---|---|---|---|---|---|
| C8 | 50 | 50 | — | Hazy | 13.2 | 99.4 |
| C9 | 85 | 15 | — | Hazy | 49.4 | 99.4 |
| C10 | 15 | 85 | — | Hazy | 17.7 | 99.5 |
| C11 | 10 | 80 | 10 | Clear | 24.7 | 99.3 |
| C12 | 45 | 45 | 10 | Hazy | 15.8 | 99.4 |
| C13 | 80 | 10 | 10 | Clear | 67.1 | 70.8 |
| E27 | 40 | 40 | 20 | Hazy | 27.3 | 98.8 |
| E28 | 70 | 10 | 20 | Clear | 71.2 | 37.3 |
| E29 | 10 | 70 | 20 | Clear | 32.5 | 99.0 |
| E30 | 35 | 35 | 30 | Hazy | 57.1 | 27.4 |
| E31 | 60 | 10 | 30 | Clear | 88.2 | 2.6 |
| E32 | 10 | 60 | 30 | Clear | 40.3 | 94.6 |
| E33 | 30 | 30 | 40 | Clear | 82.1 | 4.4 |
| E34 | 25 | 25 | 50 | Clear | 88.0 | 1.3 |
| E35 | 20 | 20 | 60 | Clear | 89.0 | 0.9 |

TABLE 5

| | PCCD | PETG | 20:80 ITR-PC | Post Extrusion appearance | % T | Haze |
|---|---|---|---|---|---|---|
| C14 | 50 | 50 | — | Opaque | 16.2 | 99.3 |
| C15 | 85 | 15 | — | Opaque | 25.8 | 99.3 |
| C16 | 15 | 85 | — | Opaque | 24.7 | 99.4 |
| C17 | 10 | 80 | 10 | Opaque | 38.3 | 99.4 |
| C18 | 45 | 45 | 10 | Opaque | 13.6 | 99.6 |
| C19 | 80 | 10 | 10 | Opaque | 35.9 | 98.3 |
| E36 | 30 | 30 | 40 | Opaque | 31.8 | 91.3 |
| E37 | 10 | 50 | 40 | Hazy | 57.1 | 87.8 |
| E38 | 50 | 10 | 40 | Opaque | 54.2 | 47.4 |
| E39 | 20 | 40 | 40 | Clear | 41.0 | 89.0 |
| E40 | 40 | 20 | 40 | Clear | 33.6 | 95.7 |
| E41 | 25 | 25 | 50 | Clear | 37.9 | 80.6 |
| E42 | 15 | 35 | 50 | Clear | 47.1 | 54.2 |
| E43 | 35 | 15 | 50 | Clear | 51.3 | 52.5 |
| E44 | 45 | 5 | 50 | Clear | 85.4 | 3.0 |
| E45 | 5.15 | 44.85 | 50 | Clear | 71.1 | 33.5 |
| E46 | 20 | 20 | 60 | Clear | 61.1 | 27.6 |
| E47 | 15 | 15 | 70 | Clear | 86.8 | 1.6 |
| E48 | 20 | 20 | 60 | Clear | 54.8 | 48.2 |
| E49 | 35 | 5 | 60 | Clear | 65.6 | 28.5 |
| E50 | 30 | 10 | 60 | Clear | 66.0 | 26.5 |
| E51 | 10 | 30 | 60 | Clear | 54.1 | 35.4 |
| E52 | 10 | 20 | 70 | Clear | 76.9 | 9.2 |
| E53 | 20 | 10 | 70 | Clear | 80.1 | 9.2 |

It can be seen from the data in Tables 2-5 that the extruded pellets comprising three polymers, having a PCCD content of 1 to 90 weight percent, a 20:80 ITR-PC content of 15 to 85 weight percent, and a content of PETG, PCTG, PBT, or PCT of 1 to 75 weight percent, are mostly all clear. However, articles molded from the same compositions do not all exhibit a total luminous transmittance value higher than 70 percent, and a haze value lower than 10 percent.

Example 8 in Table 2 show that molded articles of ternary compositions comprising at least 75 weight percent 20:80 ITR-PC, 1 to 15 weight percent PCCD, and 1 to 15 weight percent PBT have a total luminous transmittance value higher than 70 percent, and a haze value lower than 10 percent.

Examples 44, 47, 52 and 53 in Table 5 show that molded articles of ternary compositions comprising 45 to 75 weight percent 20:80 ITR-PC, 5 to 50 weight percent PCCD, and 1 to 25 weight percent PETG have a total luminous transmittance value higher than 70 percent, and a haze value lower than 10 percent.

Examples 11, 14 and 16-26 in Table 3 show that molded articles of ternary compositions comprising 15 to 75 weight percent 20:80 ITR-PC, 1 to 55 weight percent PCCD, and 1 to 75 weight percent PCTG have a total luminous transmittance value higher than 70 percent, and a haze value lower than 10 percent.

Examples 31, and 33-35 in Table 4 show that molded articles of ternary compositions comprising 25 to 65 weight percent 20:80 ITR-PC, 15 to 65 weight percent PCCD, and 15 to 35 weight percent PCT have a total luminous transmittance value higher than 70 percent, and a haze value lower than 10 percent.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition comprising
    from 15 to 98 weight percent of a polyester-polycarbonate polymer of the formula

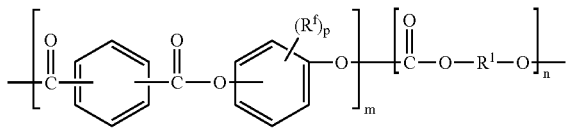

wherein each $R^1$ is independently a halogen atom, a $C_{1-12}$ hydrocarbon group, or a halogen-substituted $C_{1-12}$ hydrocarbon group, p is 0 to 4, m and n are each greater than 1, and each $R_1$ is independently a $C_{6-30}$ aromatic hydrocarbon group;
    from 1 to 90 weight percent of a first polyester comprising repeating units of the formula

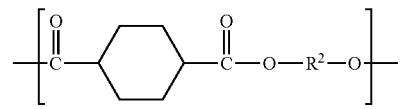

where $R_2$ is a $C_{2-8}$ divalent aliphatic group;
    from 1 to 75 weight percent of a second polyester comprising repeating units of the formula

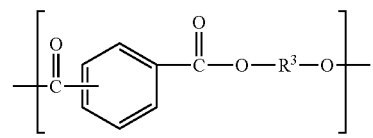

wherein $R^3$ is a $C_{2-8}$ linear divalent aliphatic group; wherein all weight percents are based on the total weight of the composition; and wherein an article molded from the composition has a percent haze value of less than or equal to 10 percent, and a total luminous transmittance value of greater than or equal to 70 percent, each measured according to ASTM D1003-00.

2. The composition of claim 1, wherein an extruded pellet comprising the composition is clear.

3. The composition of claim 2, wherein an extruded pellet comprising the composition is further colorless.

4. The composition of claim 1, wherein each $R^f$ is independently a $C_{1-3}$ alkyl group or a halogen-substituted $C_{1-3}$ alkyl group, and p is 0 to 2.

5. The composition of claim 1, wherein $R^1$ is derived from a bisphenol of the formula

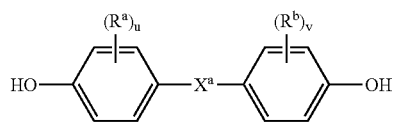

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and u and v are each independently 0 to 4.

6. The composition of claim 5, wherein $R^a$ and $R^b$ are each independently a halogen or a $C_{1-3}$ alkyl, $X^a$ is a $C_{1-18}$ alkylidene or a $C_{3-18}$ cycloalkylidene, and u and v are each independently 0 to 1.

7. The composition of claim 1, wherein the polyester-polycarbonate polymer is poly(isophthalate-terephthalate-resorcinol ester)-co-(bisphenol-A carbonate).

8. The composition of claim 1, wherein the ratio of m to n in the polyester-polycarbonate polymer is from 5:95 to 25:75.

9. The composition of claim 1, wherein m is 2 to 500, and n is 2 to 500.

10. The composition of claim 1, wherein the polyester-polycarbonate polymer further comprises additional ester units different from the isophthalate-terephthalate-resorcinol ester units.

11. The composition of claim 10, wherein the different ester units comprise isophthalate-terephthalate esters of dihydroxy compounds of the formula

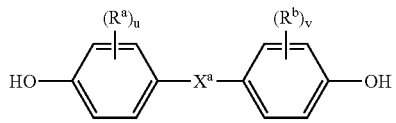

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and u and v are each independently 0 to 4.

12. The composition of claim 1, wherein the first polyester is poly(1,4-cyclohexanedimethylene-1,4-cyclohexanedicarboxylate).

13. The composition of claim 1, wherein the second polyester is poly(1,4-butylene terephthalate).

14. The composition of claim 1, wherein the second polyester is poly(1,4-cyclohexanedimethylene terephthalate).

15. The composition of claim 1, wherein the second polyester is poly(ethylene terephthalate)-co-(1,4-cyclohexanedimethylene terephthalate).

16. The composition of claim 15, wherein the poly(ethylene terephthalate)-co-(1,4-cyclohexanedimethylene terephthalate) comprises 10 to 90 mole percent ethylene terephthalate units and 10 to 90 mole percent 1,4-cyclohexanedimethylene terephthalate units, and further wherein the polyesters comprise 0 to 30 mole percent of isophthalate units, based on the total moles of isophthalate and terephthalate units.

17. The composition of claim 1, further comprising an additive selected from the group consisting of antioxidant, heat stabilizer, light stabilizer, ultraviolet light absorber, plasticizer, mold release agent, lubricant, antistatic agent, pigment, dye, gamma stabilizer, quencher, flame retardant, or a combination thereof.

18. The composition of claim 17, wherein the quencher is zinc phosphate, mono zinc phosphate, phosphorous acid, phosphoric acid diluted in water, sodium acid pyrophosphate, tetrapropyl orthosilicate, tetrakis-(2-methoxyethoxy)silane), sodium lauryl sulphate, boric acid, citric acid, oxalic acid, a cyclic iminoether containing compound, or a combination thereof.

19. The composition of claim 17, wherein the flame retardant is selected from the group consisting of a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphite, phosphonate, phosphene, halogenated phosphorus compound, inorganic phosphorus containing salt, a nitrogen-containing compound, or a combination thereof.

20. A composition comprising
from 15 to 98 weight percent of a polyester-polycarbonate polymer of the formula

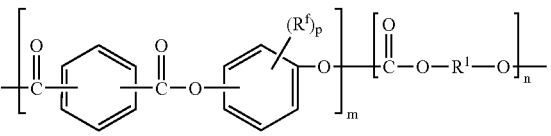

wherein each $R^f$ is independently a halogen atom, a $C_{1-12}$ hydrocarbon group, or a halogen-substituted $C_{1-12}$ hydrocarbon group, p is 0 to 4, each $R^1$ is independently a $C_{6-30}$ aromatic hydrocarbon group, m is 2 to 500, and n is 2 to 500;
from 1 to 90 weight percent poly(1,4-cyclohexanedimethylene-1,4-cyclohexanedicarboxylate);
from 1 to 75 weight percent of a second polyester consisting essentially of repeating units of the formula

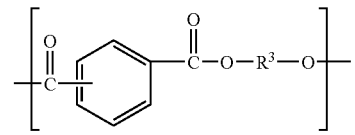

wherein $R^3$ is $C_{2-8}$ divalent aliphatic group selected from ethylene, butylene, cyclohexanedimethylene, or a combination comprising at least one of the foregoing $C_{2-8}$ divalent aliphatic groups; wherein
all weight percents are based on the total weight of the composition; and wherein an article molded from the composition has a percent haze value of less than or equal to 10 percent, and a total luminous transmittance value of greater than or equal to 70 percent, each measured according to ASTM D1003-00.

21. The composition of claim 20, wherein each $R^f$ is independently a $C_{1-3}$ alkyl group or a halogen-substituted $C_{1-3}$ alkyl group, and p is 0 to 2.

22. The composition of claim 21, wherein $R^1$ is derived from a bisphenol of the formula

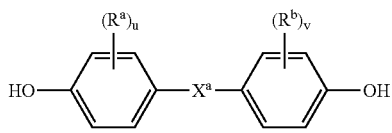

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-romatic group, and u and v are each independently 0 to 4.

23. The composition of claim 22, wherein $R^a$ and $R^b$ are each independently a halogen or a $C_{1-3}$ alkyl, $X^a$ is a $C_{1-18}$ alkylidene or a $C_{3-18}$ cycloalkylidene, and u and v are each independently 0 to 1.

24. The composition of claim 20, wherein the polyester-polycarbonate polymer is poly(isophthalate-terephthalate-resorcinol ester)-co-(bisphenol-A carbonate).

25. The composition of claim 20, wherein the ratio of m to n in the polyester-polycarbonatepolymer is 5:25 to 25:75.

26. The composition of claim 20, wherein m is 2 to 500, and n is 2 to 500.

27. The composition of claim 20, wherein the polyester-polycarbonate polymer further comprises additional ester units different from the isophthalate-terephthalate-resorcinol ester units.

28. The composition of claim 27, wherein the different ester units comprise isophthalate-terephthalate esters of dihydroxy compounds of the formula

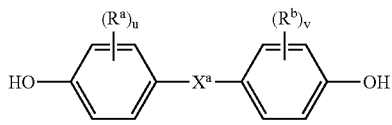

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and u and v are each independently 0 to 4.

29. The composition of claim 20, wherein the first polyester is poly(1,4-cyclohexanedimethylene-1,4-cyclohexanedicarboxylate).

30. The composition of claim 20, wherein the second polyester is poly(1,4-butylene terephthalate).

31. The composition of claim 20, wherein the second polyester is poly(ethylene terephthalate).

32. The composition of claim 20, wherein the second polyester is poly(1,4-cyclohexanedimethylene terephthalate).

33. The composition of claim 20, wherein the second polyester is poly(ethylene terephthalate)-co-(1,4-cyclohexanedimethylene terephthalate).

34. The composition of claim 33, wherein the poly (ethylene terephthalate)-co-(1,4-cyclohexanedimethylene terephthalate) comprises 10 to 90 mole percent ethylene terephthalate units and 10 to 90 mole percent 1,4-cyclohexanedimethylene terephthalate units, and further wherein the polyesters comprise 0 to 30 mole percent of isophthalate units, based on the total moles of isophthalate and terephthalate units.

35. The composition of claim 20, further comprising an additive selected from the group consisting of an antioxidant, heat stabilizer, light stabilizer, ultraviolet light absorber, plasticizer, mold release agent, lubricant, antistatic agent, pigment, dye, gamma stabilizer, or a combination thereof.

36. The composition of claim 20, further comprising a quencher, wherein the quencher is selected from the group consisting of zinc phosphate, mono zinc phosphate, phosphorous acid, phosphoric acid diluted in water, sodium acid pyrophosphate, tetrapropyl orthosilicate, tetrakis-(2-methoxyethoxy) silane), sodium lauryl sulphate, boric acid, citric acid, oxalic acid, a cyclic iminoether containing compound, or a combination thereof 37. The composition of claim 20, further comprising a flame retardant, wherein the flame retardant is selected from the group consisting of a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphite, phosphonate, phosphene, halogenated phosphorus compound, inorganic phosphorus containing salt, a nitrogen-containing compound, or a combination comprising at least one of the foregoing flame retardants.

38. The composition of claim 1, wherein the composition is clear and comprises less than 5 weight percent of a polymer selected from the group consisting of a polycarbonate, polyethylene terephthalate, and a combination thereof.

39. The composition of claim 1, wherein the composition comprises less than 20 weight percent of a polyetherimide.

40. A composition comprising
from 70 to 98 weight percent poly(isophthalate-terephthalate-resorcinol ester)-co-(bisphenol-A carbonate);
from 1 to 20 weight percent poly(1,4-cyclohexanedimethylene-1,4-cyclohexanedicarboxylate); and
from 1 to 20 weight percent poly(1,4-butylene terephthalate); wherein
all weight percents are based on the total weight of the composition; and further wherein
an article molded from the composition has a percent haze value of less than or equal to 10 percent, and a total luminous transmittance value of greater than or equal to 70 percent, each measured according to ASTM D1003-00.

41. The composition of claim 40, further comprising a quencher, wherein the quencher is selected from the group consisting of zinc phosphate, mono zinc phosphate, phosphorous acid, phosphoric acid diluted in water, sodium acid pyrophosphate, tetrapropyl orthosilicate, tetrakis-(2-methoxyethoxy)silane), sodium lauryl sulphate, boric acid, citric acid, oxalic acid, a cyclic iminoether containing compound, or a combination thereof.

42. The composition of claim 40, further comprising a flame retardant, wherein the flame retardant is selected from the group consisting of a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphite, phosphonate, phosphene, halogenated phosphorus compound, inorganic phosphorus containing salt, a nitrogen-containing compound, or a combination thereof.

43. A composition comprising
from 45 to 75 weight percent poly(isophthalate-terephthalate-resorcinol ester)-co-(bisphenol-A carbonate);
from 10 to 50 weight percent poly(1,4-cyclohexanedimethylene-1,4-cyclohexanedimethylene terephthalate), wherein the poly(ethylene terephthalate)-co-poly(1,4-cyclohexanedimethylene terephthalate) comprises from 60 to 80 mole percent ethylene terephthalate units and from 20 to 40 mole percent 1,4-cyclohexanedimethylene terephthalate units; wherein all weight percents are based on the total weight of the composition; and further wherein an article molded from the composition has a percent haze value of less than or equal to 10 percent, and a total luminous transmittance value of greater than or equal to 70 percent, each measured according to ASTM D1003-00.

44. The composition of claim 43, further comprising a quencher, wherein the quencher is selected from the group consisting of zinc phosphate, mono zinc phosphate, phosphorous acid, phosphoric acid diluted in water, sodium acid pyrophosphate, tetrapropyl orthosilicate, tetrakis-(2-methoxyethoxy)silane), sodium lauryl sulphate, boric acid, citric acid, oxalic acid, or a combination thereof.

45. The composition of claim 43, further comprising a flame retardant, wherein the flame retardant is a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphite, phosphonate, phosphene, halogenated phosphorus compound, inorganic phosphorus containing salt, a nitrogen-containing compound, a cyclic iminoether containing compound, or a combination thereof.

46. A composition comprising from 15 to 65 weight percent poly(isophthalate-terephthalate-resorcinol ester)-co-(bisphenol-A carbonate);

from 1 to 55 weight percent poly(1,4-cyclohexanedimethylene-1,4-cyclohexanedicarboxylate); and from 1 to 75 weight percent poly(ethylene terephthalate)-co-poly(1,4-cyclohexanedimethylene terephthalate); wherein the poly(ethylene terephthalate)-co-poly(1,4-cyclohexanedimethylene terephthalate) comprises from 10 to 30 mole percent ethylene terephthalate units and from 70 to 90 mole percent 1,4-cyclohexanedimethylene terephthalate units; wherein all weight percents are based on the total weight of the composition; and further wherein an article molded from the composition has a percent haze value of less than or equal to 10 percent, and a total luminous transmittance value of greater than or equal to 70 percent, each measured according to ASTM D1003-00.

47. The composition of claim 45, further comprising a quencher, wherein the quencher is zinc phosphate, mono zinc phosphate, phosphorous acid, phosphoric acid diluted in water, sodium acid pyrophosphate, tetrapropyl orthosilicate, tetrakis-(2-methoxyethoxy) silane), sodium lauryl sulphate, boric acid, citric acid, oxalic acid, a cyclic iminoether containing compound, or a combination thereof.

48. The composition of claim 45, further comprising a flame retardant, wherein the flame retardant is selected from the group consisting of a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphite, phosphonate, phosphene, halogenated phosphorus compound, inorganic phosphorus containing salt, a nitrogen-containing compound, or a combination thereof.

49. A composition comprising from 30 to 80 weight percent poly(isophthalate-terephthalate-resorcinol ester)-co-(bisphenol-A carbonate);

from 10 to 40 weight percent poly(1,4-cyclohexanedimethylene-1,4-cyclohexanedicarboxylate); and from 10 to 40 weight percent poly(1,4-cyclohexanedimethylene terephthalate); wherein all weight percents are based on the total weight of the composition; and further wherein an article molded from the composition has a percent haze value of less than or equal to 10 percent, and a total luminous transmittance value of greater than or equal to 70 percent, each measured according to ASTM D1003-00.

50. The composition of claim 49, further comprising a quencher, wherein the quencher is selected from the group consisting of zinc phosphate, mono zinc phosphate, phosphorous acid, phosphoric acid diluted in water, sodium acid pyrophosphate, tetrapropyl orthosilicate, tetrakis-(2-methoxyethoxy)silane), sodium lauryl sulphate, boric acid, citric acid, oxalic acid, a cyclic iminoether containing compound, or a combination thereof.

51. The composition of claim 49, further comprising a flame retardant, wherein the flame retardant is selected from the group consisting of a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphite, phosphonate, phosphene, halogenated phosphorus compound, inorganic phosphorus containing salt, a nitrogen-containing compound, or a combination thereof.

52. A method of forming a composition comprising melt blending the components of the composition of claim 1.

53. The method of claim 52, further comprising shaping, extruding, or molding the melt blended composition.

54. The method of claim 52, further comprising molding the melt blended composition.

55. An article comprising the composition of claim 1.

56. The article of claim 55, wherein the article is a fiber, film, or sheet.

57. A molded article comprising the composition of claim 20.

58. A molded article comprising the composition of claim 40.

59. A molded article comprising the composition of claim 43.

60. A molded article comprising the composition of claim 46.

61. A molded article comprising the composition of claim 49.

* * * * *